US011612968B1

(12) United States Patent
Schalk et al.

(10) Patent No.: US 11,612,968 B1
(45) Date of Patent: Mar. 28, 2023

(54) BRAZE GAP CONTROL TOOL SYSTEM

(71) Applicant: GM GLOBAL TECHNOLOGY OPERATIONS LLC, Detroit, MI (US)

(72) Inventors: Gregory Eric Schalk, Orchard Park, NY (US); Peter Eichensehr, Amherst, NY (US); Christian Boncek, Buffalo, NY (US); Mitchell Lee Vogatsky, North Tonawanda, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/457,014

(22) Filed: Nov. 30, 2021

(51) Int. Cl.
   *B23K 37/04*   (2006.01)
   *B23K 1/00*   (2006.01)
   *B23K 101/14*   (2006.01)

(52) U.S. Cl.
   CPC ........ *B23K 37/0443* (2013.01); *B23K 1/0012* (2013.01); *B23K 2101/14* (2018.08); *F28F 2275/045* (2013.01)

(58) Field of Classification Search
   CPC ........ B23K 37/04–0452; B23K 1/0012; B23K 2101/14; B23K 37/053–0538; F28F 2275/045
   USPC .................................. 228/49.1–49.4, 48, 185
   See application file for complete search history.

(56) References Cited

U.S. PATENT DOCUMENTS 6,308,597 B1 * 10/2001 Stable ...................... B25B 7/16
                                                     81/424

FOREIGN PATENT DOCUMENTS

| CN | 104128733 A | * | 11/2014 | ......... B23K 37/0435 |
| CN | 104384791 A | * | 3/2015 | ......... B23K 37/0443 |
| CN | 105618982 B | * | 8/2017 | |
| CN | 109332867 A | * | 2/2019 | ............ B23K 11/02 |
| CN | 111250915 A | * | 6/2020 | |
| CN | 113466582 A | * | 10/2021 | |
| WO | WO-2007128759 A1 | * | 11/2007 | ........... B23K 1/0056 |

\* cited by examiner

*Primary Examiner* — Kiley S Stoner
(74) *Attorney, Agent, or Firm* — Lorenz & Kopf LLP (57) ABSTRACT

A tool system controls and prevents gaps during processing of assemblies at elevated temperature. Gaps are prevented from arising at joints between components during temperature changes. The tool system includes a lever arm having a body, a connection configured to allow the body to pivot, a cam surface defined by the body and configured to engage the second component, and a weight arm extending from the body and over the second component. In response to movement of the second component, the lever arm is configured to pivot at the connection while the weight arm is configured to generate a force transferred through the body to the second component to maintain contact at the joint between the first component and the second component. A rod may be connected with the lever arm for added weight.

20 Claims, 6 Drawing Sheets

BRAZE GAP CONTROL TOOL SYSTEM

INTRODUCTION

The present disclosure generally relates to tool systems for controlling gaps in the processing of components, and more specifically to the control and prevention of gaps between components during thermal processing, such as during brazing.

In the production of certain products, assembled components are processed at elevated temperatures, such as by being placed in, or conveyed through, an oven or furnace. Example processing approaches include types of heat treating, drying, curing, joining, thermoforming, and others. One type of joining process involves brazing. A brazing oven/furnace may include multiple zones such as for preheating and drying and for subjecting the component assembly to various controlled environmental conditions to control the quality of metal melting and joining. A processed assembly may include a number of assembled component parts, and may be a subassembly of a more complex manufactured article. During high temperature processing, the component parts expand, and when subjected to lower temperatures contract. The influence of heat distribution through the various component parts may result in relative movements among the components. The resulting movements of and between the component parts may lead to undesirable outcomes, including at component interfaces, some of which may be classified as unacceptable in a finished product.

In one example, an automotive condenser assembly may be processed through a brazing furnace. A condenser may be composed of various parts with different sizes, shapes, materials, densities and orientations relative to one another. The parts are assembled and then conveyed through the furnace and subjected to temperatures sufficient to result in melting at the interfaces between mating parts. Accurate joining is needed to ensure the assembly holds pressure and performs according to standards. Producing quality joints on a consistent basis may be challenging, and thermal expansion related part movements may contribute to the challenges. Improvements in the processing of assembled components at elevated temperatures are therefore desired.

Accordingly, it is desirable to provide systems and apparatus for processing components to ensure quality outcomes such as the accurate formation of joints. Furthermore, other desirable features and characteristics of the present invention will become apparent from the subsequent detailed description and the appended claims, taken in conjunction with the accompanying drawings and the foregoing technical field and background.

SUMMARY

In various embodiments, a tool system controls gaps at joints between components during temperature changes. The tool system includes a lever arm having a body, a connection configured to allow the body to pivot, a cam surface defined by the body and configured to engage the second component, and a weight arm extending from the body and over one of the components. In response to movement of the components, the lever arm is configured to pivot at the connection, while the weight arm is configured to generate a force transferred through the body to one component to maintain contact at the joint between the two components.

In another embodiment, a rod is connected with the weight arm to assist in generation of the force.

In another embodiment, a second lever arm engages the second component. The rod extends through the second lever arm tying the two lever arms together.

In another embodiment, a fixture supports the components as an assembly. The fixture includes a rail, and the body includes a receiver opening into which the rail extends forming the connection.

In another embodiment, one component comprises a manifold and the other component comprises a tank.

In another embodiment, a fixture supports the components as an assembly. The fixture transports the assembly through a furnace within which temperatures are at a level sufficient to effect brazing.

In another embodiment, a brazing material is disposed on at least one of the components. The lever arm moves between a position corresponding to an ambient temperature state and another position corresponding to a braze temperature state. The braze temperature state effects flow of the brazing material.

In another embodiment, a rod is connected with the weight arm to assist in generation of the force. The weight arm and the rod are tailored in size, shape and/or length to tune a magnitude of the force.

In another embodiment, the lever arm engages one of the components through the cam surface to apply the force in a selected direction.

In another embodiment, the lever arm comprises a flat one-piece construction.

In a number of other embodiments, a tool system controls gaps at a joint between components during temperature changes. The tool system includes a pair of lever arms, each having a body, a connection configured to allow the first body to pivot, a cam surface defined by the body and configured to engage one of the components, and a weight arm extending from the body and over the component. A rod extends between, and couples together, the two lever arms. In response to movement of the components, the lever arms pivot at the connections, while the weight arms and the rod generate a force transferred through the bodies to the components to maintain contact at the joint between the components.

In another embodiment, a fixture supports the components as an assembly, and includes a rail with the first and second lever arms pivotably engaging the rail at the connections.

In another embodiment, one component comprises a manifold of a condenser core and the other component comprises a receiver-drier tank.

In another embodiment, a fixture supports the components as an assembly. The fixture transports the assembly through a furnace with temperature at a level sufficient to effect brazing. The fixture has a frame that includes the rail supporting the lever arms.

In another embodiment, a brazing material is disposed on the components. The lever arm moves between a position corresponding to an ambient temperature state and another position corresponding to a braze temperature state. The braze temperature state effects flow of the brazing material.

In another embodiment, a pair of rods are connected with the weight arms. The weight arms and the rods are tailored in size, shape and/or length to tune a magnitude of the force.

In another embodiment, the lever arms engage one of the components through the cam surfaces to apply the force in a selected direction that is horizontal.

In another embodiment, the lever arms are identical, and each comprises a flat one-piece construction.

In another embodiment, the lever arms are spaced apart to spread the force applied to the component.

In a number of additional embodiments, a tool system controls gaps at joints between components during temperature changes, the tool system comprising:

The tool system includes a pair of lever arms, each having a body, a connector configured to allow the first body to pivot, a cam surface defined by the body and configured to engage one of the components, and a weight arm extending from the body and over the component. A rod extends between, and couples together, the two lever arms. A fixture supports the components as an assembly. The fixture transports the assembly through a furnace at temperatures of a level sufficient to effect brazing. The connections are configured to engage the fixture. In response to movement of the components, the lever arms pivot at the connections, while the weight arms and the rod generate a force. The force is transferred through the bodies to the components to maintain contact at the joint between the components.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As disclosed herein, tool systems and apparatus are described for controlling or preventing gaps between components during thermal processing. In a number of embodiments, a tool system applies a continuous load to an assembly during thermal processing. Gravity induced leverage is employed to apply a force in a select direction to load one part toward another, while still allowing thermal expansion movements to occur. In an embodiment, an overhanging weight bar may be employed. Cam features may be used to apply the continuous force in the select direction. The force is tunable to provide optimized control of gaps, maintain close contact between parts, improve braze-ability, and improve product quality.

In preventing gaps during thermal processing, it has been discovered that heavy contacting fixtures may be counter-productive because they over-restrict movement, draw excessive heat from the parts they contact, and/or may damage the surfaces of the relatively thin parts they contact during high temperature processing. Over-restriction is avoided by employing the gap control tool described herein, where the amount of gravity induced force is tunable through features of an overhanging weight bar that continuously applies a force tailored to control gaps without leading to undesirable outcomes. Accordingly, expansion is allowed without binding or buckling while contact is maintained via gap control during thermally induced movements, including when expansion rates among individual parts vary.

Figure 1:
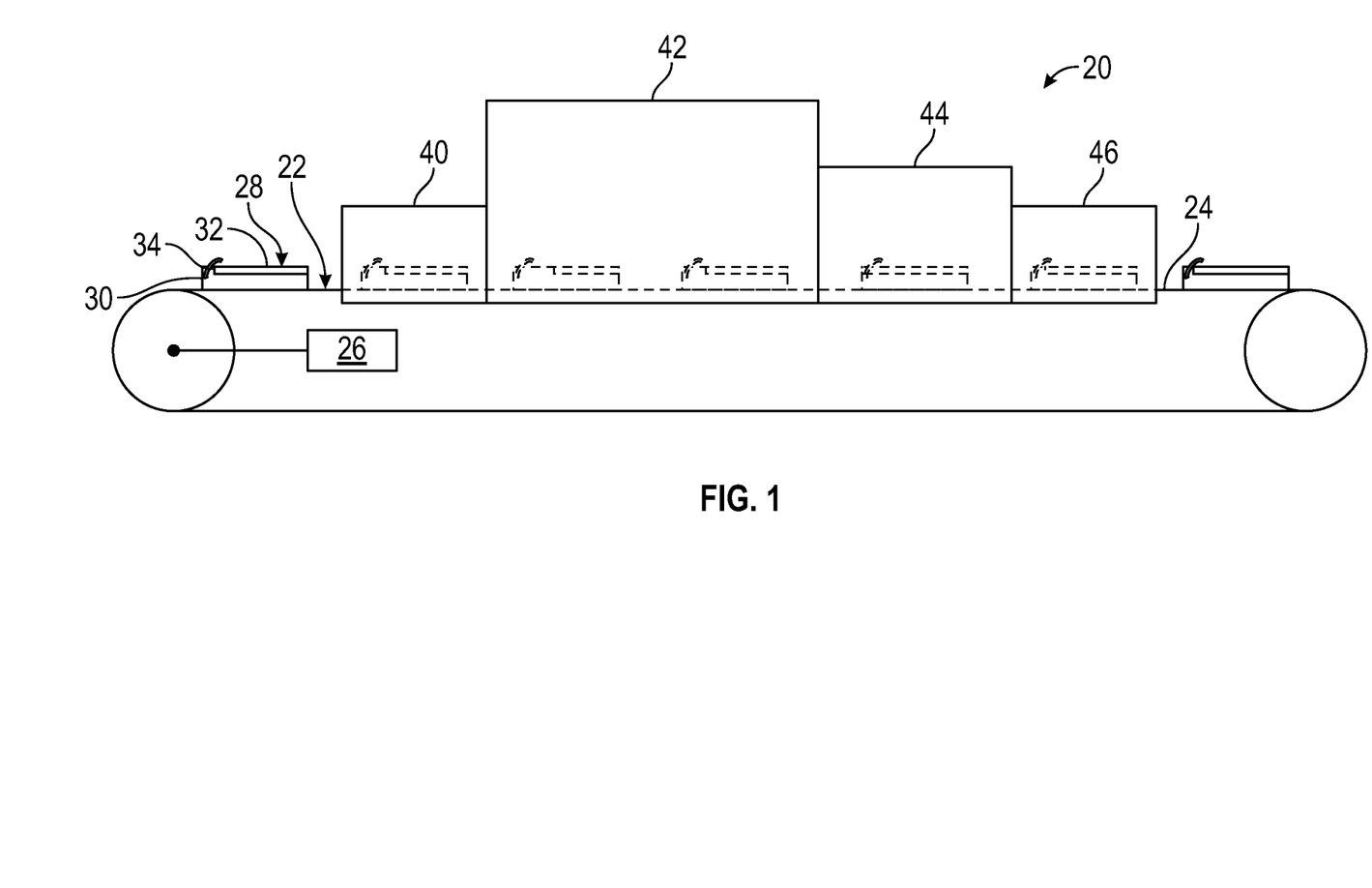
FIG. 1 is a schematic illustration of an apparatus for thermal processing products with a braze gap control tool, in accordance with various embodiments.

Referring to FIG. 1, an apparatus 20 for thermal processing of products and assemblies is illustrated in schematic form. The apparatus includes a conveyor 22, which has a belt 24 that may be a mesh or a metal link belt for high temperature tolerance. The conveyor 22 includes a drive unit 26 for automated movement of fixtures 28, including for processing through the apparatus 20. The fixtures 28 each include a frame 30 for supporting an assembly 32, and include a gap control tool 34 to apply a gap controlling force to the assembly 32 in a select direction.

Prior to entering the apparatus 20, the assembly 32 may be fabricated, assembled—at least partly, and a brazing material, and/or flux may be applied. For example, cladding may be applied as a material layer at braze joints. Flux may be applied to the components to induce clad flow to fill the joints. The apparatus 20 includes a number of stages for processing the assemblies 32, including at elevated temperatures. In the current embodiment, the apparatus 20 includes an entry shroud 40, a furnace 42, a cooling chamber 44, and an exit shroud 46. In other embodiments additional unillustrated stages such as for cleaning, drying, preheating, and/or air blasting may be included. The furnace 42 may be configured for brazing the assembly 32 and may be equipped with a gas supply (not shown) for providing a controlled environment inside the furnace 42. In the furnace 42, the assembly 32 is heated so that brazing material is brought to a liquid state for flowing, which may be aided by applied cladding and/or flux, such as to form joints and/or fillets. The cooling chamber 44 may be supplied with a coolant such as air and is configured to provide controlled cooling of the assemblies 32. The entry shroud 40 and the exit shroud 46 help maintain the controlled environment in the furnace 42 while enabling the loaded fixtures 28 to enter and exit.

Figure 2:
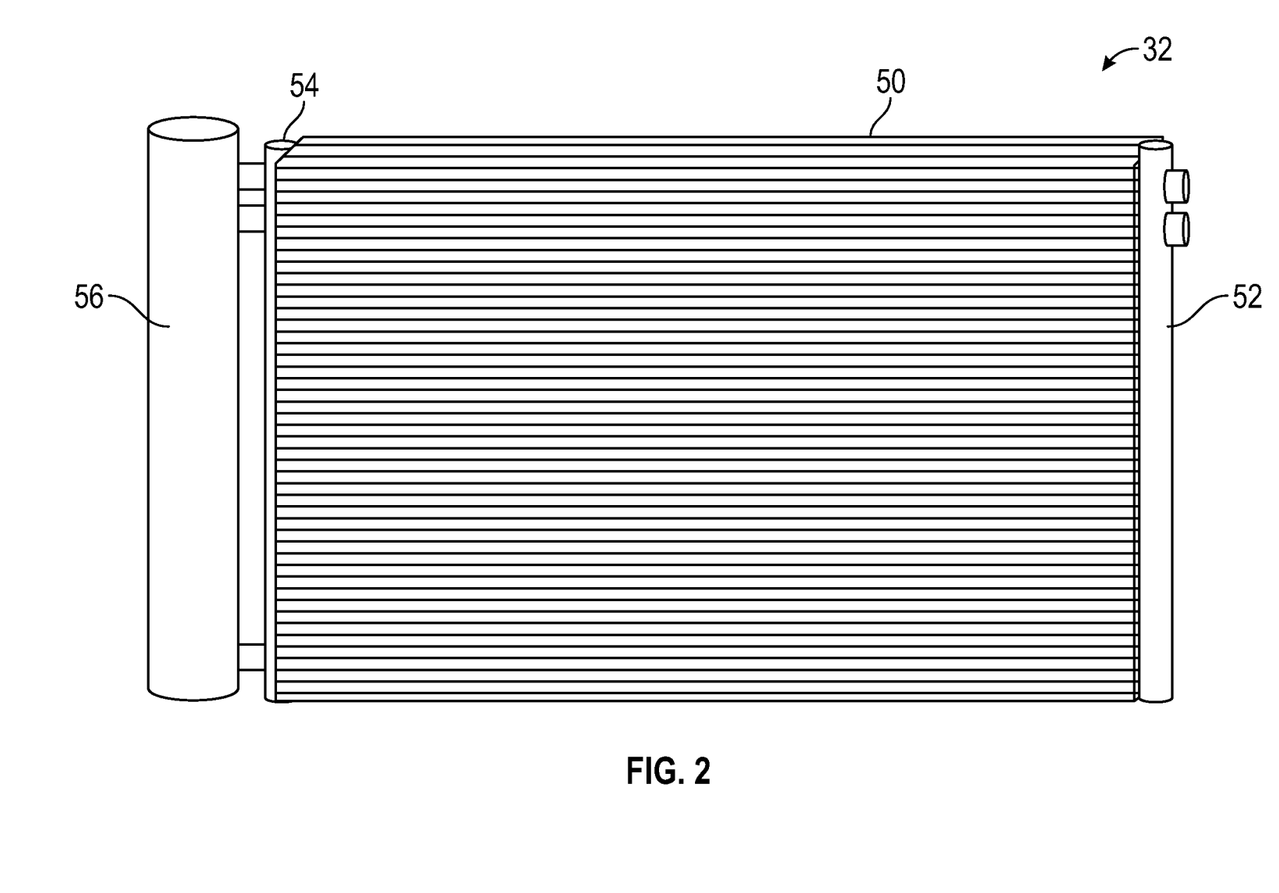
FIG. 2 is a perspective, schematic illustration of a product assembly for processing in the apparatus of FIG. 1, in accordance with various embodiments.

FIG. 2 illustrates an example assembly 32, which in this embodiment is a condenser assembly for an automobile. The assembly 32 may be a partly assembled condenser for brazing, and includes a core 50, a manifold 52, another manifold 54 and a tank 56. The core 50 is a heat exchanger element and may be of the finned tube type. The manifolds 52, 54 provide connections between the tubes of the core 50 to direct refrigerant therethrough, and provide connecting points for coupled components. The manifold 52 may have inlet and outlet connections for the assembly 32 and may be referred to as the 10 manifold 52. The manifold 54 has connections (such as saddle couplers) with the tank 56. The tank 56 may be a receiver-dryer and may be referred to as an RD tank 56. The core 50, the 10 manifold 52, the manifold 54 and the RD tank 56 may be assembled together as a subassembly for brazing and then may be fully assembled into a functional air conditioning system after brazing.

Figure 3:
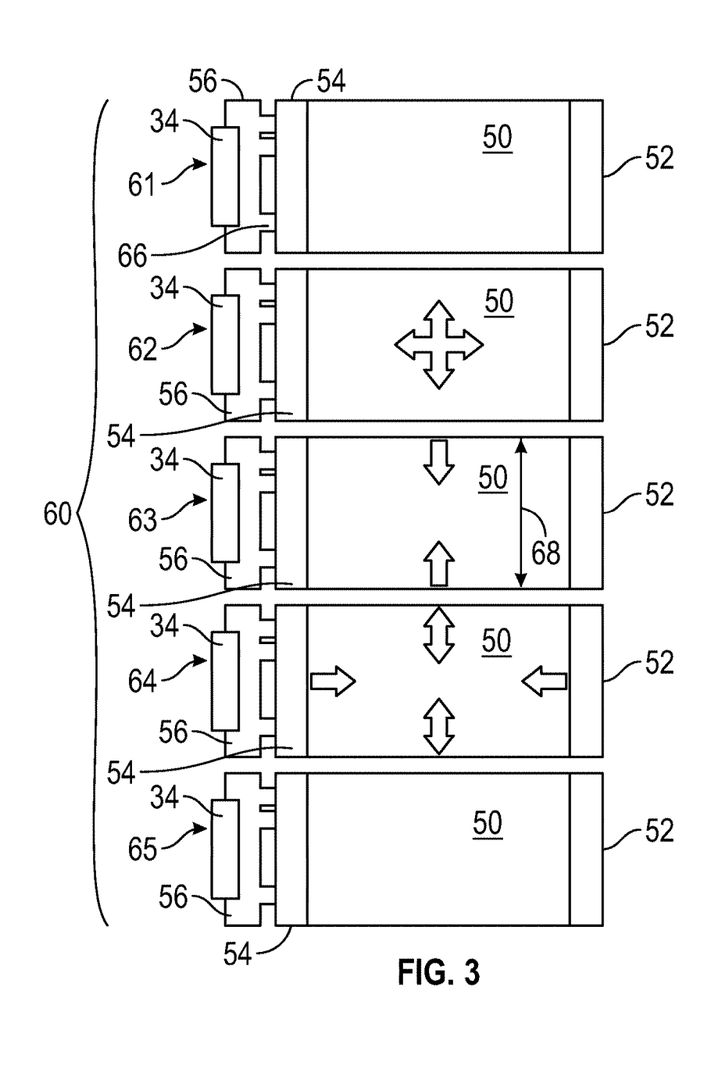
FIG. 3 is a diagram of the product assembly of FIG. 2 undergoing various stages of thermal processing with the braze gap control tool, in accordance with various embodiments.

The physics of thermal processing of the assembly 32 in the apparatus 20 is illustrated in the diagram of FIG. 3 showing a stage set 60 with five stages 61-65. The core 50, the 10 manifold 52, the manifold 54 and the RD tank 56 undergo temperature changes during brazing, with five stages illustrated. Each component may expand/contract at different rates and in different magnitudes. At stage 61, the assembly 32 is in a nominal initial state at ambient temperature prior to entering the apparatus 20. The various components, including the core 50, the 10 manifold 52, the manifold 54 and the RD tank 56, are disposed in their intended relative positions with a secure and tight fit. Various connections may be made by various attachment mechanisms, including by welding, such as for at least some connections between the RD tank 56 and the manifold 54. For example, a joint 66 may be a welded coupler connection.

During heat up in stage 62, such as in the furnace 42, the components of the assembly 32 including the core 50, the 10 manifold 52, the manifold 54 and the RD tank 56, expand and move as a result of thermal growth during heating. As the assembly 32 grows and moves individual parts may move relative to one another and stress may be applied to joints and connections. For example, it has been found that the RD tank 56 may move up to eleven millimeters during braze temperature exposure. As a result, the connections, including those between the RD tank 56 and the manifold 54, are susceptible to stress. Accordingly, the fixture 28 includes the gap control tool 34 to counter the stress.

In the furnace 42 at braze temperature, the brazing material/cladding melts and flows. For example, a clad aluminum alloy material may be used for components that has a base alloy that provides structural strength and a clad layer that has a lower melting temperature for brazing. At stage 63, while in the furnace 42, the brazing material/clad alloy melts and seals joints in and between the different components. High temperatures, such as 1100 degrees Celsius may be employed. At these temperatures, features such as welded joints may have very low yield strengths. Weld joints may be used at various locations such as between the RD tank 56 and the manifold 54 as an example, and may be welded prior to brazing. Welds may be intended to hold components together into the braze furnace 42. Once at high temperatures, the welds may have little to no effect on holding the components together when brazing forces are present. While at temperature, as the cladding melts, some dimensions, such as the width 68 of the core 50, have been discovered to shrink, which results in forces arising between components including between the RD tank 56 and the manifold 54.

Following brazing in the furnace 42, the assembly 32 cools at stage 64, such as in the cooling chamber 44. Dimensions of the components, including the length 70 of the core 50 begin to return to nominal and the melted cladding solidifies. During this process, the gap control tool 34 applies force to maintain the connections between the RD tank 56 and the manifold 54. At stage 65, the assembly 32 has returned to ambient temperature and nominal dimensions. Through use of the gap control tool 34, welded connections are maintained with integrity.

Figure 4:
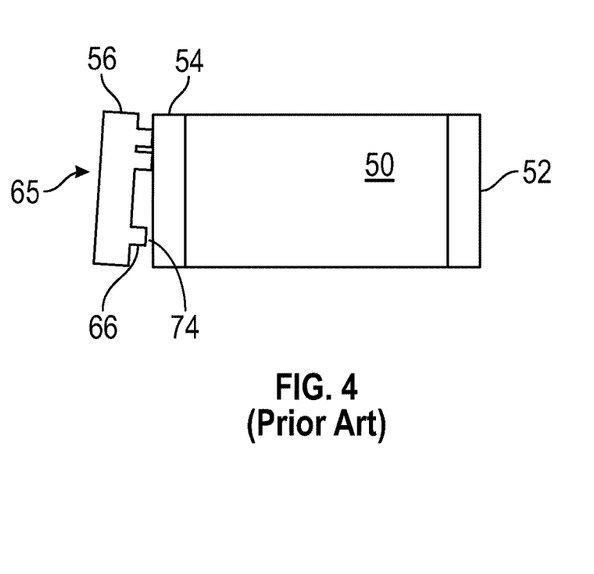
FIG. 4 is a diagram of the fifth stage of the thermal processing of FIG. 4, in accordance with the prior art.

Referring to FIG. 4, potential results of the prior art (without use of the gap control tool 34), are illustrated schematically. In this case after cooling occurs, the joint 66 has a gap 74 and/or is separated due to the thermal excursions of the components of the assembly 32. For example, when cooling begins at the end of the assembly 32 that includes the 10 manifold 52, thermal contraction may create a pulling separation force at the joint 66 creating the gap 74 before the brazing material/cladding solidifies. The creation of initial gaps as small as a fraction of a millimeter have been found to lead to separation at the joint 66.

Figure 5:
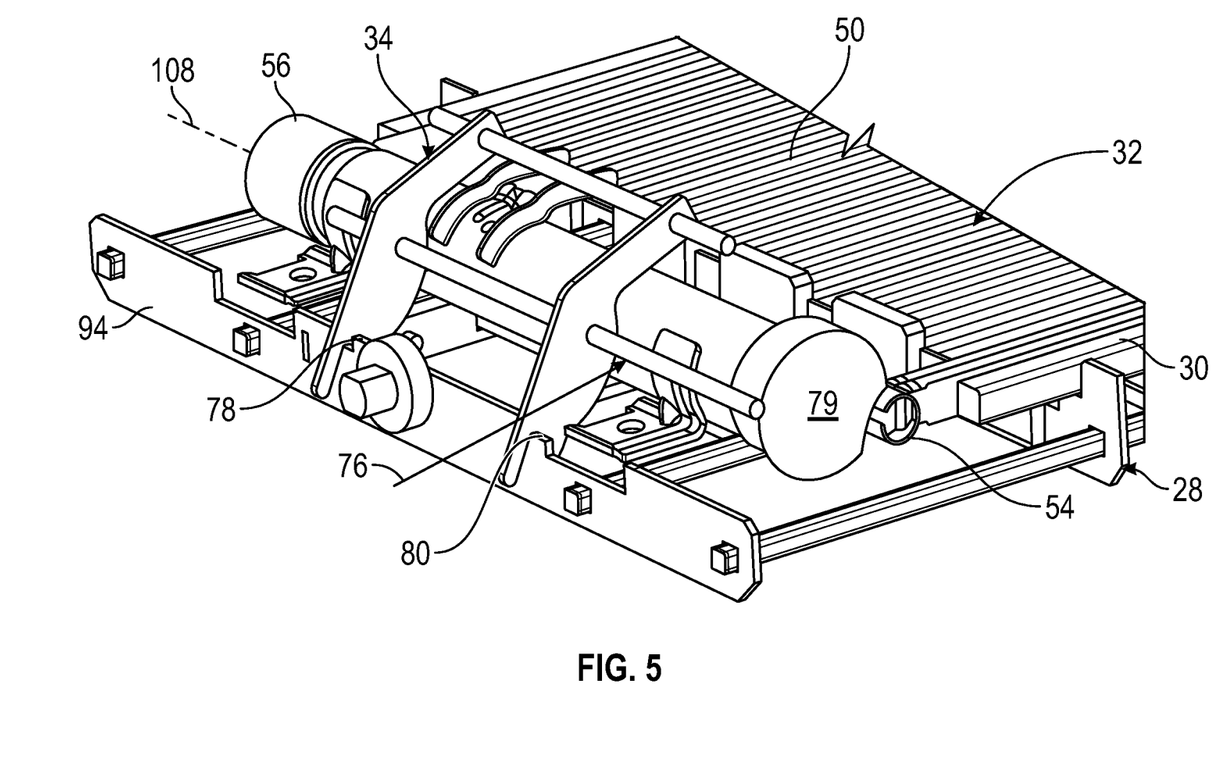
FIG. 5 is a fragmentary, perspective illustration of the product of FIG. 2 mounted on the braze gap control tool, in accordance with various embodiments.

To avoid the potential for the results described in relation to FIG. 4, the gap control tool 34 shown in FIG. 5 applies a constant force 76 during the entire thermally related expansion, movement, and contraction of the assembly 32. In the fragmentary view, part of the core 50, along with the RD tank 56 and the manifold 54 are illustrated with the assembly 32 mounted on the frame 30 of the fixture 28. The gap control tool 34 of the fixture 28 engages the frame 30 at pivots 78, 80. The gap control tool 34 is made of a material that withstands the high temperatures of brazing and remains intact. In one embodiment, the gap control tool 34 is made of stainless steel and includes a welded construction. In a number of embodiments, an end cap 79 may be positioned over the RD tank 56 to protect against flux and/or contaminants.

Figure 6:
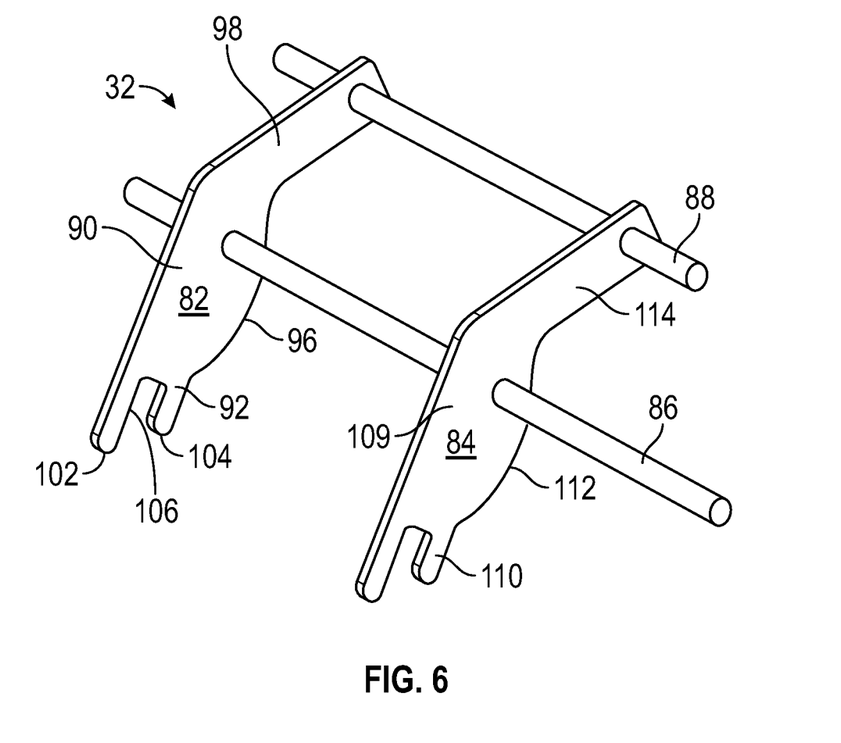
FIG. 6 is a fragmentary, perspective illustration of a part of the braze gap control tool of FIG. 5, in accordance with the prior art.

Referring additionally to FIG. 6, the gap control tool 34 includes a pair of spaced apart lever arms 82, 84 and one or more rods, which in this embodiment includes two rods 86, 88, extending through the lever arms 82, 84. The rods 86, 88 structurally couple the lever arms 82, 84 together and provide weight to counter forces that arise during processing of the assembly 32. In the current embodiment the rods 86, 88 are elongated and solid with a circular cross sectional shape. In other embodiments rods 86, 88 with other geometric shapes and/or constructions may be used. The lever arms 82, 84 apply the force 76 to the RD tank 56 and are spaced to spread the force along the RD tank 56. The rod 88 is disposed directly above, in a vertical direction, the RD tank 56.

The lever arm 82 includes a body 90 with a connection 92 allowing articulation of the body 90 by pivotably engaging the frame 30 at a rail 94 thereof, as shown in FIG. 5. The body 90 includes a cam surface 96 for engaging the RD tank 56. A weight arm 98 extends from the body 90 and over the RD tank 56. The connection 92 includes a pair of legs 102, 104 defining a receiver opening 106 into which the rail 94 fits. The leg 104 is shorter than the leg 102 facilitating an orientation of the lever arm 82 with an incline toward the RD tank 56. In the current embodiment, the lever arm 82 sits on the rail 94 without being fixed to the rail. In other embodiments, another form of pivot joint may be used such as a pinned hinge or a strap. The cam surface 96 is formed as a convex curved surface that allows the RD tank 56 to move along its profile without binds. The contour of the cam surface 96 may have a profile to apply a consistent force level throughout travel. In other embodiments, the cam surface 96 may have a profile that varies the amount a force applied. For example, near maximum thermal expansion conditions, the amount of force may be increased by the shape of the cam profile to avoid gaps. The cam surface 96 is disposed to operate at or near the vertical height of the centerline 108 of the RD tank 56, and to apply a horizontal force thereto.

The lever arm 84 is formed similar to the lever arm 82 with a body 109, a connection 110, a cam surface 112, and a weight arm 114. The lever arms 82, 84 are formed of a flat one-piece construction that may be readily fabricated from sheet or plate material by cutting or stamping. The lever arms 82, 84 may have the same shape and size as one another to simplify fabrication.

Figure 7:
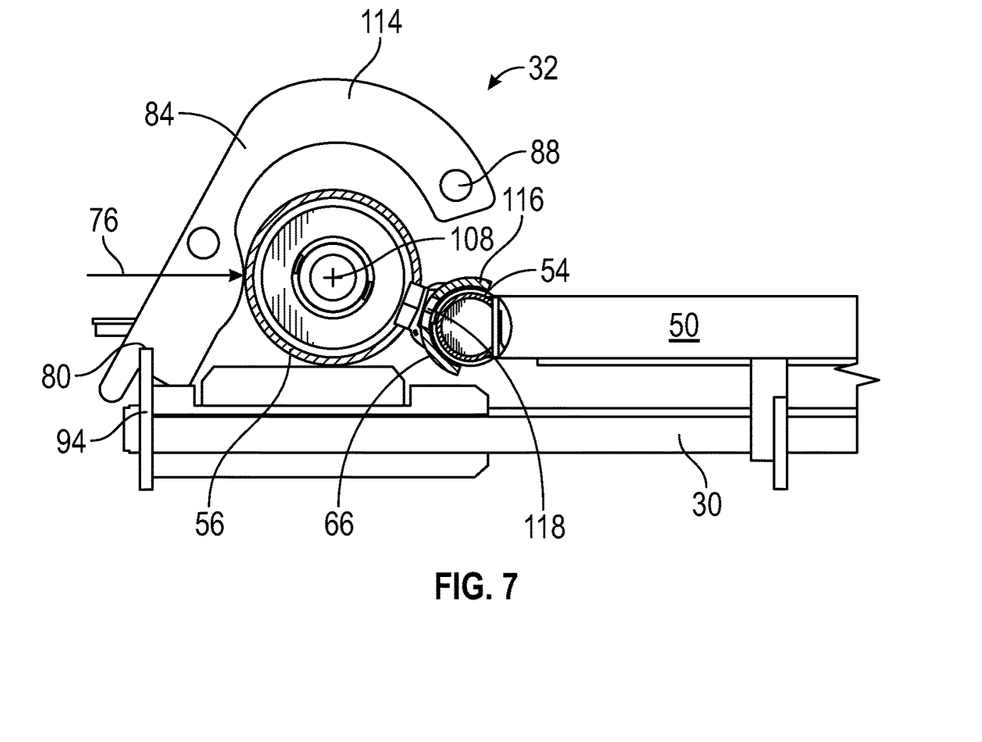
FIG. 7 is a fragmentary, perspective illustration of the product of FIG. 2 mounted on the braze gap control tool, with the tool in a first state, in accordance with various embodiments.
Figure 8:
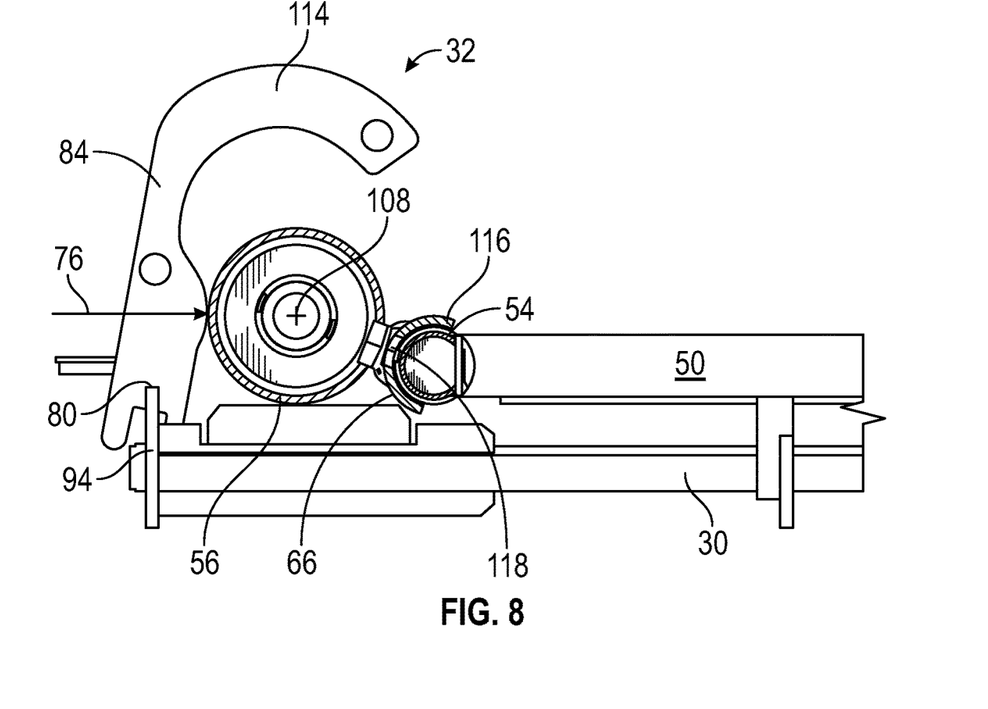
FIG. 8 is a fragmentary, perspective illustration of the product of FIG. 2 mounted on the braze gap control tool, with the tool in a second state, in accordance with various embodiments.

Referring additionally to FIGS. 7 and 8, operation of the gap control tool 34 is illustrated in two states. The lever arm 84 may have a shape tailored to develop a desired amount of force on the RD tank 56. In this embodiment, the weight arm 114 is curved and the rod 88 is located further out from the pivot 80 and directly above the manifold 54. The joint 66 includes a saddle type coupler 116 that is welded in place and includes a conduit 118 for communicating refrigerant between the RD tank 56 and the manifold 54. Accordingly, if gaps arise in the joint 66, the conduit 118 may be susceptible to leaking.

FIG. 7 shows the gap control tool 34 in the nominal state at ambient temperature before and after brazing related expansion. FIG. 8 shows the gap control tool 34 at an elevated temperature state at the height of braze expansion, which in this example is at a braze temperature level. With reference to FIGS. 5, 7 and 8, as temperature increases and the RD tank 56 moves relative to the frame 30, the gap control tool 34 allows the movement to occur. Leverage points are used at the rail 94 of the frame 30 at the pivots 78, 80. The amount of the force 76 applied is tuned to control gap formation without restricting movement. To tailor the magnitude of the force 76, the length of the weight arms 98, 114 may be selected and the weight of the rods 86, 88 may be selected to apply sufficient force to avoid gap formation without stopping or inhibiting movement. The amount of weight and the positioning of the rods 86, 88 may be determined, such as by modelling using commercially available software and/or by testing in the apparatus 20. From the state of FIG. 7 to the state of FIG. 8, the gap control tool 34 moves by rotating about the pivots 78, 80 under the force applied to it by the RD tank 56. The cam surfaces 96, 112 allow the bodies 90, 109 and the outer perimeter of the RD tank 56 to slide relative to one another. In some embodiments, the weight arms 98, 114 themselves may generate sufficient force obviating a need for the rods 86, 88. Through the cam surfaces 96, 112, the force 76 is directed in a selected horizontal direction at the height of the centerline 108 to maintain contact. In other embodiments, such as due to the physical relation of components in the assembly 32, the force 76 may be pointed in another select direction to maintain contact.

Accordingly, a gap control tool has a design that uses leverage and gravity to apply a constant force in a desired direction to maintain contact between component parts and prevent gap formation as temperatures fluctuate. Relatively free movement is allowed for expansion and contraction, while the mating positions of coupled components are maintained. The gap control tool pivots on the frame of a fixture to act as a mounting point. By using overhanging leverage, the rod and cam surfaces apply a continuous directed force to keep gap from opening in a couple joint. Weight arms and the rod may be tailored in size, shape and/or length to tune a magnitude of the force that is applied.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A tool system for controlling gaps at joints between a first component and a second component during temperature changes, the tool system comprising:
a lever arm having a body, a connection configured to allow the body to pivot, a cam surface defined by the body and configured to engage the second component, and a weight arm extending from the body and over the second component,
wherein, in response to movement of the second component, the lever arm is configured to pivot at the connection while the weight arm is configured to generate a force transferred through the body to the second component to maintain contact at the joint between the first component and the second component.

2. The tool system of claim 1, comprising a rod connected with the weight arm to assist in generation of the force.

3. The tool system of claim 2, wherein the lever arm is a first lever arm, and comprising a second lever arm configured to engage the second component, wherein the rod extends through the second lever arm tying the first lever arm together with the second lever arm.

4. The tool system of claim 1, comprising a fixture configured to support the first and second components as an assembly, the fixture including a rail with the body including a receiver opening into which the rail extends.

5. The tool system of claim 1, wherein the first component comprises a manifold and the second component comprises a tank.

6. The tool system of claim 1, comprising a fixture configured to support the first and second components as an assembly, the fixture configured to transport the assembly through a furnace at temperatures at a level sufficient to effect brazing.

7. The tool system of claim 1, comprising a brazing material on at least one of the first component and the second component, wherein the lever arm is configured to move between a first position corresponding to an ambient temperature state and a second position corresponding to a braze temperature state, wherein the braze temperature state effects flow of the brazing material.

8. The tool system of claim 1, comprising a rod connected with the weight arm to assist in generation of the force, wherein the weight arm and the rod are tailored in at least one of size, shape and length to tune a magnitude of the force.

9. The tool system of claim 1, wherein the lever arm is configured to engage the second component through the cam surface to apply the force in a selected direction.

10. The tool system of claim 1, wherein the lever arm comprises a flat one-piece construction.

11. A tool system for controlling gaps at a joint between a first component and a second component during temperature changes, the tool system comprising:
a first lever arm having a first body, a first connection configured to allow the first body to pivot, a first cam surface defined by the first body and configured to engage the second component, and a first weight arm extending from the first body and over the second component;
a second lever arm having a second body, a second connection configured to allow the second body to pivot, a second cam surface defined by the second body and configured to engage the second component, and a second weight arm extending from the second body and over the second component; and a rod extending between and coupling together the first lever arm and the second lever arm, wherein, in response to movement of the second component, the first lever arm and the second lever arm are configured to pivot at the first and second connections while the first and second weight arms and the rod are configured to generate a force transferred through the first and second bodies to the second component to maintain contact at the joint between the first component and the second component.

12. The tool system of claim 11, comprising a fixture configured to support the first and second components as an assembly, the fixture including a rail with the first and second lever arms pivotably engaging the rail at the first and second connections.

13. The tool system of claim 11, wherein the first component comprises a manifold of a condenser core and the second component comprises a receiver-drier tank.

14. The tool system of claim 11, comprising a fixture configured to support the first and second components as an assembly, the fixture configured to transport the assembly through a furnace at temperatures at a level sufficient to effect brazing, wherein the fixture has a frame that includes a rail that supports the first and second lever arms.

15. The tool system of claim 11, comprising a brazing material on the first component and the second component, wherein the lever arm is configured to move between a first position corresponding to an ambient temperature state and a second position corresponding to a braze temperature state, wherein the braze temperature state effects flow of the brazing material.

16. The tool system of claim 11, wherein the rod comprises a first rod, and comprising a second rod connected with the first and second weight arms, wherein the first and second weight arms and the first and second rods are tailored in size, shape and length to tune a magnitude of the force.

17. The tool system of claim 11, wherein the first and second lever arms are configured to engage the second component through the first and second cam surfaces to apply the force in a selected direction that is horizontal.

18. The tool system of claim 11, wherein the first lever arm comprises a flat one-piece construction and the second lever arm is identical to the first lever arm in shape.

19. The tool system of claim 11, wherein the first and second lever arms are spaced apart to spread the force applied to the second component.

20. A tool system for controlling gaps at a joint between a first component and a second component during temperature changes, the tool system comprising:

a first lever arm having a first body, a first connection configured to allow the first body to pivot, a first cam surface defined by the first body and configured to engage the second component, and a first weight arm extending from the first body and over the second component;

a second lever arm having a second body, a second connection configured to allow the second body to pivot, a second cam surface defined by the second body and configured to engage the second component, and a second weight arm extending from the second body and over the second component;

a rod extending between and coupling together the first lever arm and the second lever arm; and a fixture configured to support the first and second components as an assembly, the fixture configured to transport the assembly through a furnace at temperatures at a level sufficient to effect brazing, wherein the first and second lever arms are configured to engage the fixture at the first and second connections, wherein, in response to movement of the second component, the first lever arm and the second lever arm are configured to pivot at the first and second connections while the first and second weight arms and the rod are configured to generate a force transferred through the first and second bodies to the second component to maintain contact at the joint between the first component and the second component.

\* \* \* \* \*